July 25, 1967 G. G. HAVENS 3,332,815
METHOD AND APPARATUS FOR CONTINUOUSLY FORMING
ELONGATED HOLLOW ARTICLES
Filed June 15, 1964 4 Sheets-Sheet 1

INVENTOR.
GLENN G. HAVENS
BY Fulwider, Patton, Rieber,
Lee and Utecht
ATTORNEYS

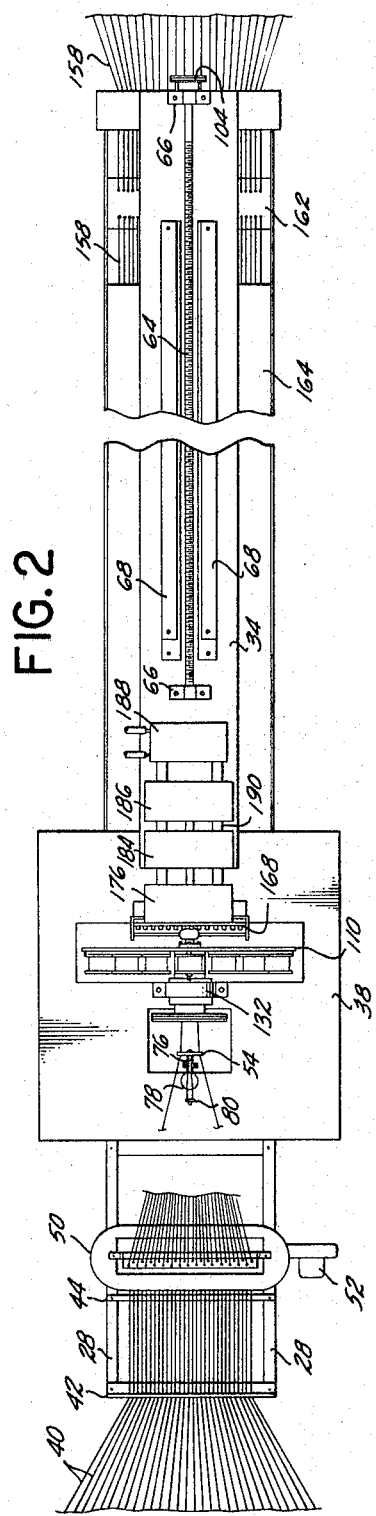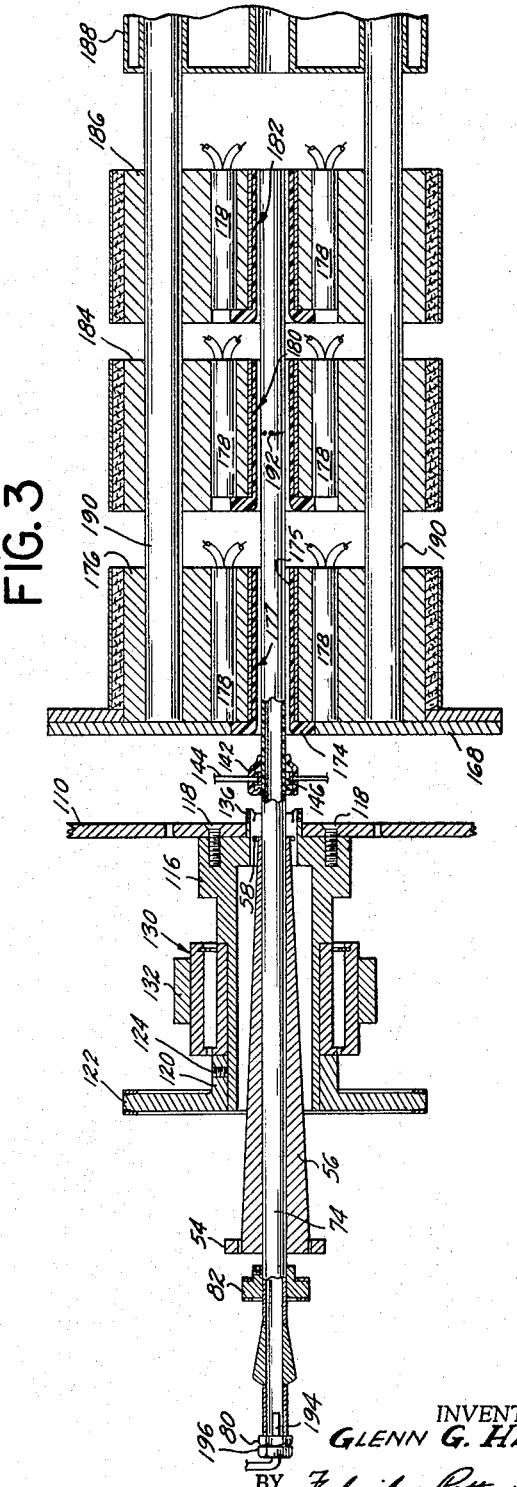

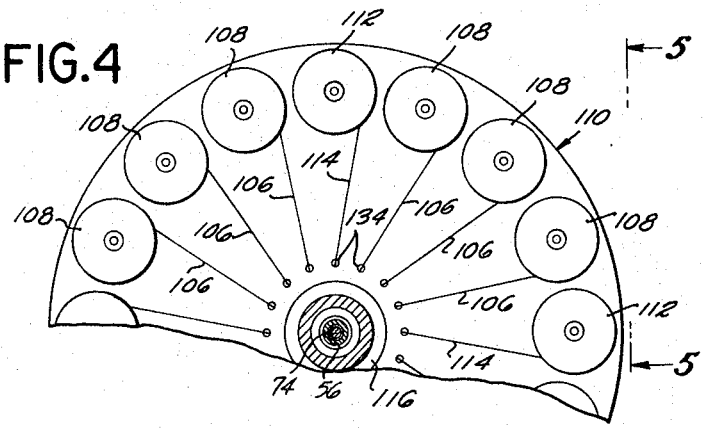
FIG.4
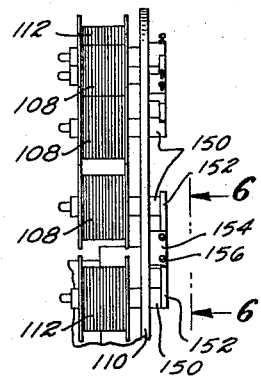
FIG.5
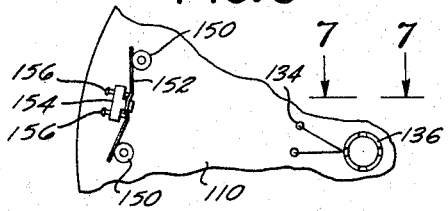
FIG.6
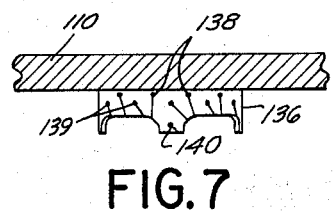
FIG.7
FIG.8
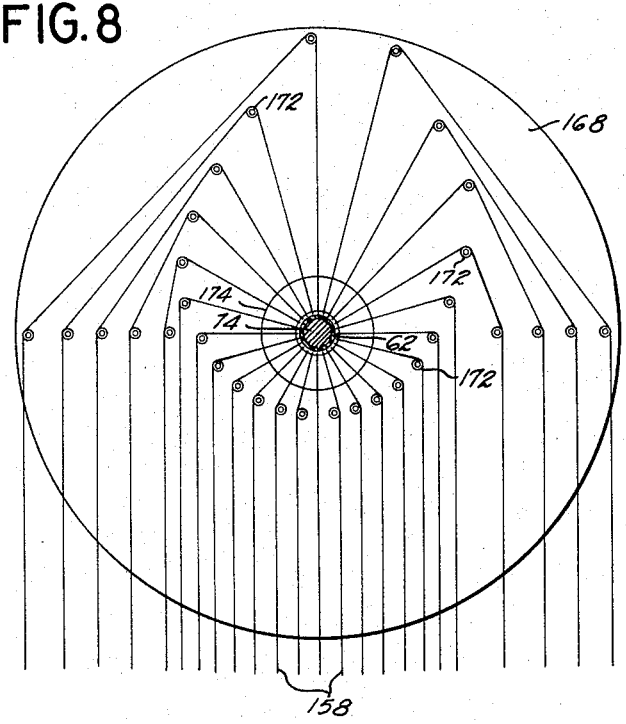
FIG.9
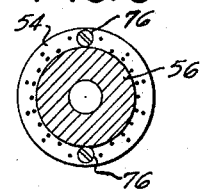
FIG.10
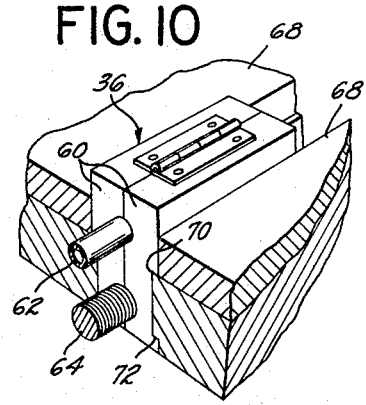
INVENTOR.
GLENN G. HAVENS
BY *Fulwider, Patton, Rieber,*
*Lee and Utecht*
ATTORNEYS

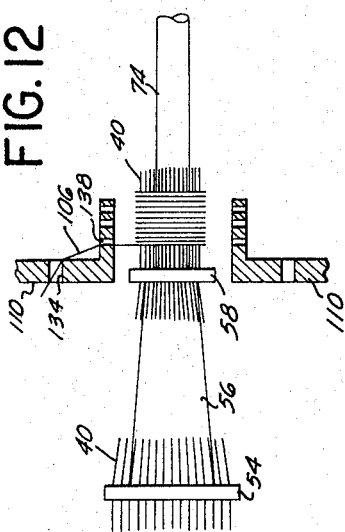
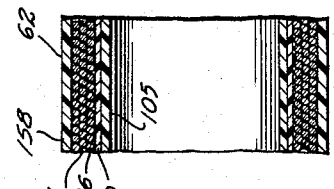
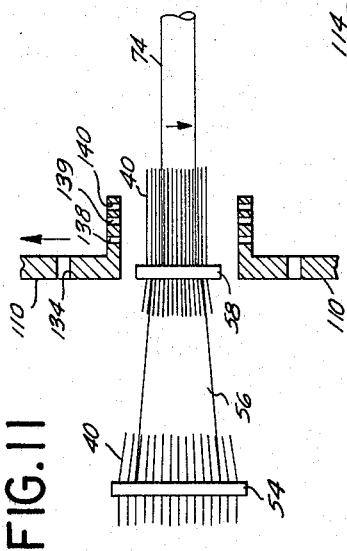

United States Patent Office 3,332,815
Patented July 25, 1967

3,332,815
METHOD AND APPARATUS FOR CONTINUOUSLY FORMING ELONGATED HOLLOW ARTICLES
Glenn G. Havens, 8133 Aero Drive,
San Diego, Calif. 92123
Filed June 15, 1964, Ser. No. 374,927
4 Claims. (Cl. 156—175)

ABSTRACT OF THE DISCLOSURE

A method and apparatus for continuously forming pipe or tubing out of continuous fiber windings, and utilizing a mandrel to receive parallel, longitudinally oriented fibers upon which other fibers are wound, the longitudinal fibers being used to longitudinally pull the assembled fibers off the mandrel, and the mandrel being rotatable in a direction opposite the direction of winding of the other fibers to thereby maintain the longitudinal fibers in their parallel, longitudinal orientation on the mandrel.

---

The present invention relates to a method and apparatus for continuously forming elongated hollow articles, and particularly hollow articles which include a plurality of continuous, perimetrical fiber or filament windings for resisting high internal pressures.

The use of interlaced or woven fibers or filaments of glass or the like to produce high strength reinforced plastic pipe and tubing is well known. However, the use of woven material renders such pipe and tubing relatively expensive and does not provide optimum structural properties. The cross-over points of the fibers exhibit structural weakness, and the voids at such points of intersection further reduce the strength of the article by lowering the fiber-to-resin ratio. Consequently, low cost pipe and tubing of optimum strength is best provided by applying endless fibers to a forming member in a continuous process.

One of the difficulties encountered in applying such endless fibers to a forming member lies in obtaining satisfactory separation after the pipe or tubing is completely fabricated. Inasmuch as a great portion of the fibers are circumferentially oriented, axial removal tends to delaminate or unravel the circumferential fibers, particularly in special applications where the circumferential windings are desirably dry or unimpregnated with resin. Such a special application is more particularly set forth in my co-pending application Ser. No. 208,776, filed July 10, 1962, and entitled, "Solvent Separation Apparatus and Method of Manufacture."

In the above-identified patent application a special porous tubing is disclosed which is operative to effect a desalinization operation by utilization of the reverse osmosis phenomenon. For this purpose the tubing comprises woven fibers reinforced by a resinuous material and characterized by an internal layer of unimpregnated fibers upon which a semi-permeable membrane is cast. The membrane is adapted to perform a desalinization function but is of low structural strength and depends for support upon the tubing. However, in order to effect good outward transfer from the tubing of the fresh water exuding radially outwardly from the membrane, the fresh water must be able to migrate axially to a limited degree in order to find an exit opening in the porous tubing. This is one important function of the unimpregnated inner layer of the tubing. As will be seen, the present invention is particularly adapted to provide porous tubing suitable for this purpose.

Accordingly, it is an object of the present invention to provide a method and apparatus for producing low cost, hollow elongated articles such as pipe and tubing by utilizing continuous, non-woven fibers or filaments suitably reinforced in whole or in part by a resinuous material.

Another object of the invention is the provision of such a method and apparatus for applying axial or longitudinally extending, resin impregnated fibers upon a mandrel preliminary to the application of any circumferential windings to thereby facilitate axial removal of the completely fabricated article without unraveling such windings.

A further object of the invention is to provide a method and apparatus of the aforementioned character adapted to provide a uniform circumferential distribution of longitudinal fibers upon a mandrel and thereafter to apply a circumferential winding of fibers, and wherein the mandrel is adapted to rotate slowly in a direction opposite the direction of winding of the circumferential fibers thereby to maintain the longitudinal fibers axially straight relative to the mandrel. In this regard it has been found that in the absence of such compensating mandrel rotation the longitudinal fibers tend to be displaced or twisted and tend to bind more tightly upon the mandrel in proportion to the efforts to effect separation of the completed article from the mandrel, this effect sometimes being referred to as the "Chinese finger" effect.

Another object of the invention is the provision of a method and apparatus adapted for forming elliptical, polygonal, or similar closed configurations by deforming an initially fabricated article during the curing of the resin used to bind the constituent elements of the article.

Yet another object of the invention is to provide a method and apparatus adapted to provide elongated hollow reinforced plastic articles of unlimited length in an expeditious and inexpensive manner through the utilization of an axially stationary mandrel from which the article is continuously pulled or axially separated. In this regard it is a related object of the method and apparatus to fabricate tubing by using a large number of circumferential fiber windings to provide higher resistance to internal pressures, an inner layer of a comparatively few longitudinally oriented fibers to facilitate separation of the tubing from the mandrel without snarling or snubbing of the circumferential windings, and an outer layer of longitudinally oriented fibers to provide the longitudinal strength necessary for axially separating the tubing from the mandrel.

A further object of the invention is to provide a method and apparatus adapted for fabricating reinforced plastic tubing and similar articles of hollow cross-section for applying to a mandrel continuous fiber material, and particularly a considerable number of circumferentially oriented fibers, without resin impregation of the circumferential windings until after the windings are in place upon the mandrel, thereby greatly simplifying the handling and processing of the winding material prior to deposition upon the mandrel.

Other objects and features of the invention will become apparent from consideration of the following description taken in connection with the accompanying drawings, in which:

FIG. 2 is a plan view of the apparatus of FIG. 1;

FIG. 3 is an enlarged longitudinal sectional view taken along the line 3—3 of FIG. 1;

FIG. 4 is an enlarged elevational view of the spool-carrying wheel of the apparatus, a portion of the wheel being cut away for brevity;

FIG. 5 is an elevational view of the spool-carrying wheel of FIG. 4, taken along the direction of the arrow 5 in FIG. 4, a portion of the wheel being cut away for brevity;

FIG. 6 is a partial elevational view taken along the direction of arrow 6 in FIG. 5, and illustrating the face of the spool-carrying wheel opposite that illustrated in FIG. 4;

FIG. 7 is a detail view taken along the line 7—7 of FIG. 6;

FIG. 8 is an enlarged elevational view of an alignment plate for aligning the outer longitudinal fibers of a length of tubing, the view being taken along the line 8—8 of FIG. 1;

FIG. 9 is an enlarged vertical sectional view taken along the line 9—9 of FIG. 1;

FIG. 10 is an enlarged partial perspective view of clamping means for axially advancing the finished article along the length of the apparatus;

Figure 1:
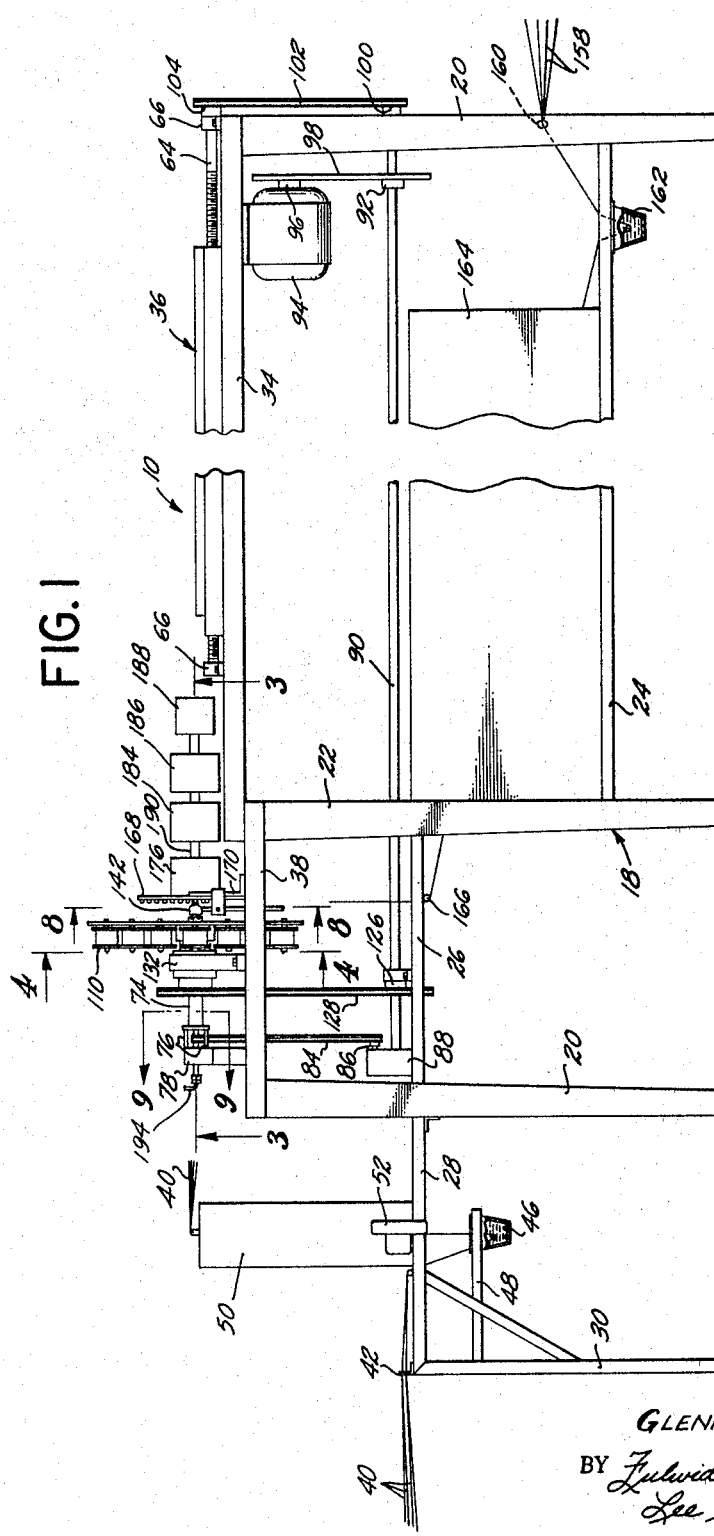
FIG. 1 is a side elevational view of one form of apparatus for carrying out the method of the invention.

FIGS. 11–14 are partially diagrammatic views illustrating, respectively, the application of an inner layer of longitudinally oriented fibers upon the mandrel, the application of an initial layer of circumferential fiber windings upon the inner fiber layer, the application of additional circumferential windings upon the first layer of circumferential windings, and the application of an outer layer of longitudinally oriented fibers overlying the circumferential windings, FIG. 14 additionally illustrating a device for coating resinous material upon the wound circumferentials just prior to application thereon of the outer longitudinal fibers; and FIG. 15 is a longitudinal view, partially in section, illustrating one form of tubing which the present method and apparatus is adapted to manufacture.

Referring now to the drawings, and particularly to FIGS. 1–3, there is illustrated an apparatus 14 for manufacturing a continuous length of ½" diameter hollow tubing out of continuous fibers of glass. However, the manufacture of glass fiber tubing is merely exemplary and it will be understood that the apparatus is also adapted for orienting and assembling fibers of materials other than glass, and in non-circular cross-sections as well.

By way of general introduction, the apparatus 14 is adapted to apply three groups of glass fibers to an axially stationary forming member. These groups comprise a group of inner, longitudinally oriented fibers, a group of circumferential windings, and a group of outer, longitudinally oriented fibers. The inner and outer longitudinals are impregnated or coated with a suitable resinous material to effect anchorage of the adjacent portions of the circumferential windings and to facilitate separation of the composite tubing from the mandrel in a continuous manner subsequent curing of the resinous material.

For this purpose, the apparatus 14 comprises a suitable frame 16 for mounting the various components of the apparatus, the frame 16 having a plurality of corner posts or uprights 20 and intermediate uprights 22. The lower extremities of a pair of the corner uprights 20 are connected to the lower extremities of the intermediate uprights 22 by a rectangular support shelf 24, as best illustrated in FIG. 1. The intermediate uprights 22 are similarly connected by horizontally disposed braces 26 to the midportions of the remaining pair of corner uprights 20. The frame 18 also includes a horizontal shelf constituting an oven support 28 which is connected between the leftmost pair of corner uprights 20 and a pair of support uprights 30.

At the right extremity of the apparatus 16, as viewed in FIG. 1, the upper extremities of the uprights 20 and 22 support a horizontally disposed puller plate or bed 34 to which is rigidly secured a tube puller 36. To the left of the puller 34 is located a horizontal main bed 38 rigidly attached to the upper extremities of the uprights 20 and 22 and adapted for supporting various other components of the apparatus 16.

The layer of glass fibers forming the innermost layer of the tubing produced by the apparatus 16 is constituted of a plurality of fibers or strands herein conveniently referred to as "inner longitudinals" and designated at 40 in FIG. 1. Such fibers are supplied to the apparatus from a plurality of bobbins or spools (not shown) suitably mounted on a rack or the like, and are fed to the right as viewed in FIG. 1. Each longitudinal 40 is preferably a single yarn having approximately one twist per inch with 102 fibers per yarn. This yarn produces an optimum quality tubing for the special desalinization application for which the apparatus 16 is particularly adapted, as will be described more completely hereinafter.

From the supply spools the inner longitudinals are trained through separate transversely arranged rows of openings provided in an upright transverse guide 42 secured to the left end of the oven support 38, and then pass over a horizontally and transversely disposed guide rod 44 as best seen in FIG. 2. The incoming longitudinals 40 next pass downwardly through a resin tray or tank 46 which is supported beneath the oven support 28 by horizontal support elements 48 secured to the support uprights 30. The particular resin utilized for impregnation or coating of the longitudinals 40 is not critical to the present invention so long as it is characterized by a capacity for effecting a bond between adjacent glass fibers. However, a thermosetting phenolic resin is preferred for the manufacture of desalinization tubing since it characteristically produces a porous structure. On the other hand, any of a great variety of resin types may be used, if desired, for the manufacture of commercial pipe and the like.

Uniformity of the resin coating upon the longitudinals 40 is controlled by any suitable doctor blade arrangement (not shown) within the tank 46, and the coated fibers next move upwardly through the interior of a drying oven 50 which is maintained at a temperature of 180 to 200° F. by a heater-blower 52 operative to circulate hot air upwardly through the oven interior. The length of the oven is made sufficiently long, in accordance with the rate of travel of the longitudinals, to permit the resin on the longitudinals to advance or cure to the point where it is dry or at the B stage. In this condition the longitudinals do not tend to adhere to any surface over which they ride.

The dried longitudinals 40 then pass to the right in an axial or horizontal direction, as viewed in FIG. 3, and are threaded or trained through equally spaced, circumferentially arranged openings provided in a guide flange 54 which forms the left end of a centrally bored, axially tapered winding nozzle 56. The longitudinals then gradually converge toward the longitudinal axis of the nozzle 56, along the diminishing diameter or tapered portion thereof, and are next threaded through circumferential openings in a guide flange 58 located at the right end of the nozzle 56. The openings in the flange 58 correspond in number and circumferential placement to the openings in the opposite flange 54 so that the longitudinals 40 are gradually brought more closely together in a circumferential group surrounding the longitudinal axis of the nozzle 56.

As will be seen, the longitudinals 40 and the other fibers constituting a portion of the tubing are subsequently joined together and cured at elevated temperatures to provide a composite, high strength article which is continuously withdrawn from the apparatus 16, that is, advanced to the right as viewed in FIG. 1, by the tube puller 36 as fast as it is formed. It is this force produced by the puller 36 which advances the longitudinals 40 through the apparatus 16 and maintains a desirable tension in the longitudinals at all times.

A plurality of tube pullers 36 are preferably used to advance the tubing through the apparatus 16, but for brevity only one puller 36 is illustrated in FIG. 10. The puller 36 includes a pair of hinged parts 60 which, in their closed positions, as illustrated in FIG. 10, define opposite halves of an upper, axially oriented bore for closely receiving a length of completed or cured tubing 62 in gripping relationship. Similarly, the lower portions of the hinged parts 60 define opposite halves of a threaded, axially oriented opening for threadably receiving an axially extending, threaded shaft 64. As seen in FIG. 2, the opposite extremities of the threaded shaft 64 are rotatably supported by usual bushing mounts 66 secured to the upper surface of the puller bed 34 so that rotation of the shaft 64 in the proper direction advances the pullers 36 to the right.

During this travel each tube puller 36 is constrained against movement to an open position by a pair of longitudinally extending puller guide structures 68 fixed to the puller bed 34 and defining a slot or groove for axially slidably receiving the pullers. The confronting surfaces of the guide structures 68 and the adjacent mating surfaces of the tube puller 36 are complementally grooved, as at 70 and 72, to provide ways for slidably accommodating the pullers 36 during axial, threaded advancement thereof by the threaded shaft 64. In addition, the complemental shoulders and grooves 70 and 72 prevent any appreciable transverse movement of the pullers 36 and thereby properly align and support the discharge end of the tubing 62.

As best viewed in FIG. 2, the bushing mounts 68 terminate short of the bushing mounts 66 to provide a space for manual removal of a tube puller from the right end of the guide structure 68, and replacement thereof in the left or feed end of the guide structures. With this arrangement the tubing 62 is firmly clamped during advancement toward the discharge end of the apparatus 16 by pullers which are manually repositioned. However, it will be apparent that this procedure can be automated if desired.

The tapered winding nozzle 56 guides the inner longitudinals 40 into positions spaced from one another and also equally circumferentially spaced about a forming member or mandrel 74 and, as will be seen, are urged into engagement with the mandrel by reason of an overlying layer of circumferential windings. These circumferential windings are applied in a counterclockwise direction and tend to disturb the axial alignment and uniform circumferential distribution of the inner longitudinals 40 upon the surface of the mandrel 74. It is an important feature of the present invention that the mandrel 74 is adapted for rotation in a clockwise direction, looking toward the discharge end of the apparatus 16, to compensate for the tendency of the circumferentials to axially offset the inner longitudinals 40 in a counterclockwise direction. More particularly, the winding nozzle 56, which is supported at its right or discharge end by the mandrel 74, is supported at its left end by a pair of axially oriented struts 76, as best viewed in FIGS. 1, 2 and 9, the struts 76 being loosely secured at their opposite ends to the nozzle flange 54 and to a vertically disposed binding post 78 secured to the main bed 38. The struts 76 prevent the winding nozzle 56 from moving axially, but permit pivotal movement of the nozzle about the adjacent ends of the struts 76 so that the nozzle 56 "floats" and thereby automatically aligns itself with the axis of the mandrel 74 which is rotatably receives.

The mandrel 74 is likewise secured against axial movement by the binding post 78 but, unlike the winding nozzle 56, is rotatably mounted within a suitable opening provided in the post 78. The left end of the mandrel 74 is threaded to receive a nut 80 for securing the mandrel 74 against axial movement relative to the post 78, while yet affording relative rotational movement.

The previously adverted to clockwise rotation of the mandrel 74 is imparted by a sprocket 82 which is secured to the mandrel 74 by a set screw or the like, and which is rotated by a vertically oriented chain 84, as best viewed in FIG. 1. The chain 84 is driven by a sprocket 86 which is rotated by a conventional speed reduction unit 88 actuated by a longitudinally extending drive shaft 90. The drive shaft 90 mounts a pulley 92 which is rotated by a conventional electric motor 94 mounted to the underside of the puller bed 34 and operatively coupled to the pulley 92 by a motor pulley 96 and a drive belt 98.

The drive shaft 90 extends to the right beyond the pulley 92 for mounting another pulley 100 to rotate the threaded puller shaft 64 through a belt 102 coupled to a pulley 104 which is mounted at the right end of the threaded shaft 64. Thus, the motor 94 simultaneously operates the threaded puller shaft 64 as well as effecting clockwise rotation of the mandrel 74. The circumferential windings, which will next be described, are applied over the inner longitudinals 40 at approximately 50 to 100 revolutions per minute, and it has been found that a compensating opposite rotation of the mandrel 74 of approximately ½ to 2 revolutions per minute has operated satisfactorily when the rate of axial travel of the tubing 62 through the apparatus is approximately 6 to 7 inches per minute.

There are actually three layers of circumferential windings applied over the inner longitudinals 40 in order to provide tubing 62 particularly adapted for a desalinization system, as best illustrated in FIG. 15. In this regard, it has been found that optimum desalinization is accomplished when the innermost circumferential layer is constituted by closely adjacent convolutions of glass fiber yarn of the same type as the inner longitudinals 40. These fine circumferentials provide good surface continuity for supporting the semi-permeable desalinization membrane 105. In this regard, when the term "layer" is used herein, except in connection with the inner longitudinals 40, it is intended to mean a complete covering of the surface upon which the fibers are laid, without significant spaces between the respective fibers constituting the layer.

As best viewed in FIGS. 1, 4–7, and 12, the innermost fibers comprising the fine circumferential windings, often referred to herein as "fine circumferentials" and designated by the numeral 106, are carried on a plurality of feed spools 108 which are equally spaced about and rotatably mounted adjacent the periphery of a spool-carrying wheel 110. An identical set of feed spools 112 is similarly rotatably mounted about the periphery of the wheel 110 for carrying a supply of fibers constituting heavy circumferentials 114. The circumferentials 114 are preferably made of glass fibers in which two pairs of yarns of the fibers are twisted about each other, with each yarn having approximately 102 fibers with a twist of about 3.8 turns per inch. The spool-carrying wheel accommodates four of the feed spools 112 for the heavy circumferentials and 12 feed spools 108 for the fine circumferentials, the respective spools being located about the wheel periphery in balanced relationship.

As best viewed in FIG. 3, the spool-carrying wheel 110 is secured to an elongated, axially extending, and substantially cylindrical support element 116 by a plurality of machine screws 118, the feed end of the cylindrical element 116 being secured within a boss 120 of a drive sprocket 122 by means of a set screw 124 threaded to the boss 120 and bearing against the support element 116. The drive sprocket 122, as best viewed in FIG. 1, is driven by a sprocket 126 through a chain 128, and the sprocket 126 is secured to the drive shaft 90 whereby rotational drive for the spool-carrying wheel 110 is derived from the electric motor 94.

The support element 116 is mounted for rotation within a fairing 130 which is constituted of conventional outer and inner races with roller bearings therebetween, the inner race being rotatable with the support element 116 and the outer race being rigidly secured to a bearing mount 132 which is fixed to the main bed 38 of the apparatus. With this arrangement, the spool-carrying wheel 110 rotates about the axis of the mandrel 74. Both the fine and heavy circumferentials 106 and 114 are led radially inwardly and each trained through an individual one of a plurality of apertures 134 provided in the wheel 110 in spaced, circumferential relationship about the axis of rotation of the wheel 110.

After passing through the apertures 134, the circumferentials are located on the opposite or discharge face of the wheel 110, and are next trained through openings provided in a cylindrical circumferential winding nozzle 136, the fine circumferentials 106 passing through apertures 138 located proximate the discharge end of the flange 58 from which the inner longitudinals 40 are being drawn, and the heavy circumferentials 114 passing through two separate rows of apertures 139 and 140 located remote or more distant from such flange 58. With this arrangement, the fine circumferentials 106 are first wound about the mandrel 74 with the inner longitudinals 40 thereon, followed by an overlying layer of heavy circumferentials 14 from the apertures 139, and then a third overlying layer of heavy circumferentials 14 passing from the apertures 140.

As best viewed in the diagrammatic showings in FIGS. 11–14, this arrangement provides an inner layer of inner longitudinals 40 upon the mandrel 74, an overlying layer of fine circumferentials 106, a layer of heavy circumferentials 14, and finally a last layer of heavy circumferentials 114, as shown in FIG. 14.

The counetrclockwise rotation of the spool-carrying wheel 110 causes the circumferentials to tend to displace the inner longitudinals 40 in a counterclockwise direction, as previously indicated, and the clockwise rotation of the mandrel 74 offsets this displacement and maintains the longitudinals 40 in axially straight and parallel relationship. If such a correction or compensation were not provided, the inner longitudinals 40 would tend to spiral about the mandrel 74 and the constant pull upon the tubing 62 in a discharge direction would cause the longitudinals 40 to grip and bind against the mandrel 74 progressively more tightly. Eventually the tubing 62 would structurally fail and prevent further operation of the apparatus 16 until the break was repaired.

The external periphery of the last layer of circumferentials 114 is coated with a liquid resinous material immediately subsequent deposition upon the preceding layers. Such coating is accomplished by an open-ended, generally cylindrical grommet 142 disposed about the circumferential windings upon the mandrel 74 in wiping engagement therewith. The grommet end openings slidably accommodate the wound mandrel, with the downstream or discharge opening serving as a doctor blade for resin drawn from the hollow interior of the grommet and deposited upon the wound mandrel. The resin passes by gravity from a suitable supply tank (not shown) through a supply tube 144 in fluid communication with the interior of the grommet for filling the interior. In this regard, the grommet is maintained in an expanded condition to provide an internal resin reservoir by means of a resilient metal ring 146. The ring 146 is secured to a vertically oriented support rod 148 fixed at its lower end to the main bed 38 to thereby support the grommet in position. This arrangement provides a thin, uniform coating of resin upon the outermost circumferential layer to facilitate bonding between such layer and the next layer to be applied, as will be seen.

Tension is provided in the circumferentials 106 and 114 during their application to the mandrel by adjustably retarding the rotation of the feed spools 108 and 112, as best viewed in FIG. 6. More particularly, each spool includes a shaft which is rotatable within a suitable opening provided in the spool-carrying wheel 110, and a collar 150 is press-fitted or otherwise securely mounted to the protruding end of such shaft for common rotation. A leaf spring 152 is suitably carried by a bracket 154 which is mounted to the wheel 110, and the opposite ends of the leaf spring 152 are arranged to frictionally ride upon the exterior surfaces of a pair of adjacent collars 150 associated with an adjacent pair of feed spools. The degree of friction involved in such engagement is adjusted by rotation of a pair of set screws 156 mounted in the bracket 154, appropriate rotation of one of the set screws 94 tending to urge the associated extremity of the leaf spring 152 against one of the collars 150 and slow rotation of the associated feed spool.

The outermost layer of fibers is comprised of a plurality of longitudinally oriented rovings of glass fiber, which are conveniently referred to herein as "outer longitudinals" numeral 158. Each roving comprises approximately 20 yarns which each comprise about 102 fibers having no apparent twist. The outer longitudinals are carried by 24 feed spools (not shown) which are located adjacent the discharge end of the apparatus 16 and from which the longitudinals are drawn in the direction of the feed end of the apparatus. As best viewed in FIGS. 1 and 6, the outer longitudinals 158 are trained over a transverse guide rod 160 supported at its opposite extremities by an adjacent pair of the uprights 20, and then downwardly into a resin tank 162 supported beneath the shelf 24 of the apparatus.

The particular resin utilized for impregnation of the outer longitudinals 158 is not critical so long as it is characterized by good structural integrity upon curing. As compared to the resin utilized for coating the inner longitudinals 40, which resin had to be of a more adhesive nature to effect a good bond to the overlying fine circumferentials 106, the resin used for impregnating the outer longitudinals 158 must be adapted to harden or cure to sufficient strength to obtain good bending or flexural strength in the finished tubing 62. A form of thermosetting phenolic resin is preferred for this purpose since such tubing for desalinization purposes must be of a porous nature. However, various other types of resin will immediately suggest themselves to those skilled in the art, depending upon the particular application which is contemplated for the tubing or pipe produced by the present apparatus.

Uniformity of the resin coating upon the outer longitudinals 158 is controlled by any suitable doctor blade arrangement (not shown) within the tank 162. The coated fibers pass upwardly from the tank 162 and then horizontally into the interior of an elongated drying oven 164 supported by the shelf 24. The oven 164 is preferably maintained at a temperature of approximately 200 to 225° F. by a heater-blower (not shown) located in the oven, and the length of the oven is of sufficient length to permit the resin on the outer longitudinals 158 to advance or cure to the point where it is dry or at the B stage when the longitudinals 158 leave the oven. This reduces undesirable sticking and adhesion of the longitudinals to the guiding surfaces over which they ride.

From the oven 164 the dried longitudinals 158 are trained around a transverse guide rod 166 secured between a pair of the braces 26, and then pass upwardly to a circular alignment plate 168, which is best illustrated in FIG. 8.

The plate 168 is rigidly secured to the main bed 38 by a bracket 170 and includes a plurality of transversely grooved pins 172 rotatably mounted and spaced over the surface of the plate in a pattern minimizing interference between the respective longitudinals 158. The longitudinals are trained within the grooves of the pins 172 for guidance inwardly through a central opening in the plate 168 in a uniform circumferential pattern for application to the outer layer of circumferentials 114 already applied to the mandrel 74.

As best viewed in FIGS. 3 and 14, the outer longitudinals are uniformly spaced about the periphery of the circumferentially wound mandrel and are urged against the mandrel by a flanged guide member 174 secured to the plate 168 and having a central opening through which the longitudinals are trained. The central opening is characterized by a faired entry portion for smoothly receiving the longitudinals 158, while the portion of the guide member 174 located beyond the entry is dimensioned to perform or press the outer longitudinals upon the already deposited circumferentials. The member 174, together with a tubular sleeve 175 with which it abuts at one end, constitute a forming die 177 for the as yet uncured tubing 62 as it is advanced in an axial direction. Possible sticking or adhesion of the impregnated longitudinals 158 to the guide member 174 and sleeve 175 during such advancement is greatly reduced by coating the interior surface of the member 174 and sleeve 175 with a low friction, low adherance material such as tetrafluorethylene. The forming die 177 is located within a central opening provided in an aluminum block 176 which is electrically heated by cartridge heaters 178. Second and third dies 180 and 182, constituted by guide members and sleeves which are substantially identical to the guide member 174 and sleeve 175, are mounted within aluminum blocks 184 and 186. These blocks are substantially identical to the block 176, being heated by cartridge heaters 178. The temperature of each of the blocks 176, 184 and 186, and consequently the temperature of the dies 177, 180 and 182, is regulated by any suitable temperature control apparatus (not shown) to maintain the temperature of the first and second dies 177 and 180 at approximately 350 to 400° F. to preform or mold the longitudinals and circumferentials in the space defined between the mandrel 74 and the adjacent die surface, and maintain the third die 182 at a temperature of between 425 and 480° F. At these temperatures the resinous material forming a part of the composite tubing 62 is polymerized or cured at the point of exit from the last die 182, at a rate of travel of the tubing of approximately 6 to 7 inches per minute. The cured tubing then passes through a central opening in a cooling block 188 having interior spaces adapted for receiving a cooling agent such as water to hasten cooling of the cured tubing and permit immediate handling, use or storage. The discharge end of the mandrel 74 preferably extends to a position adjacent the discharge side of the last heating block 186, at which point the resinous material of the tubing 62 is sufficiently cured to enable the tubing to be pulled off the mandrel by the tube pullers 36.

The heating and cooling blocks are each provided with upper and lower axially extending openings which slidably receive a pair of cantilevered support rods 190 secured at their feed end extremities to the stationary alignment plate 168. The rods 190 are characterized by limited capability for deflection so that the heating and cooling blocks are adapted for movement in accordance with the position of the mandrel 74. In addition, the axial positions of the heating and cooling blocks is adjustable by loosening set screws (not shown) positioned in the blocks and ordinarily bearing against the rods 190 in clamping engagement.

Those surfaces of the apparatus 16 over which the impregnated longitudinals 40 and 158 pass are preferably coated or otherwise treated to reduce possible sticking of the impregnated fibers and also reduce any tendency for resin to build up on the surface in question. A suitable coating for this purpose is tetrafluoroethylene material. For example, the mandrel 74 is made of metal but includes an external tetrafluoroethylene sleeve or layer which is bonded to the exterior wall of the sleeve. This layer preferably extends from the feed side of the coating grommet 142 to the discharge face of the last heating block 186 and, if desired, the layer may taper inwardly very slightly in that direction to account for differential expansion of the mandrel and layer in the various temperature zones along the length of the mandrel.

Resin buildup on the peripheral surface of the mandrel 74 during passage thereof through the heating blocks can also be reduced by elevating the temperature of one or more of the heating blocks in excess of 600° F. to carbonize any collected resin. However, at this high temperature the speed of axial travel of the mandrel 74 will have to be proportionately increased to avoid overcuring. Any resin carbonized in this manner tends to form a fine grit or dust which enhances the desired relative axial movement or separation always occurring between the tubing 62 and the mandrel 74.

Although not illustrated, suitable parting agents such as combinations of stearic acid and silicones, are preferably coated upon the inner and outer longitudinals for further reducing friction and possible adherence of these elements to the mandrel 74. Various parting agents as well as suitable locations for applying such agents to the longitudinals, or to parts of the apparatus in contact with such longitudinals, will be readily apparent to those skilled in the art and will therefore not be described.

One method employed in the present apparatus for applying a parting agent to the inner longitudinals 40 is best illustrated in FIG. 3. A silicone parting agent or the like is supplied from a suitable reservoir through a tube 194 which is mounted by a nut 196 at the left end of the mandrel 74 for fluid communication with the hollow interior of the mandrel. The opposite open end of the mandrel 74 is plugged or closed in any suitable manner (not shown), so that the silicone solution fills the hollow interior of the mandrel 74. A plurality of circumferentially arranged orifices 192 are provided in the mandrel 74 adjacent the heated block 184, and the exudation of the silicone facilitates separation of the partially cured inner longitudinals from the exterior surface of the mandrel.

It is important to note that the silicone parting agent is applied only after the inner longitudinals have been partially polymerized or cured. If the agent were applied sooner, the longitudinals would be unable to bond to the first winding of circumferentials 106, and if applied after the inner longitudinals are fully cured, the longitudinals may already have adhered to the mandrel. Thus, application of the parting agent is most effective when applied in the heated area and at a point between initial and final curing or polymerization of the resin on the inner longitudinals.

The dies 177, 180, and 182 have been described as having a central opening of circular cross-section for forming tubing 62 of circular cross-section, but it will be apparent that the dies may be differently configured if differently shaped tubing, pipe or structural articles are desired. Since passage of the tubing 62 through the dies progressively imparts the configuration of the dies during the curing process, the dies would be made progressively more like the article configuration desired as the tubing moves in the discharge direction. Thus, the die 177 would be essentially circular in cross-section, the opening in the third die 182 would be that of the configuration desired, and the opening the second die 180 would be an intermediate form of the desired configuration. Thus, the apparatus 16 is adapted to form a variety of elongated articles in various configurations by merely substituting the requisite forming dies.

From the foregoing it will be apparent that a method and apparatus has been provided for manufacturing continuous lengths of hollow reinforced plastic articles, and particularly continuous lengths of hollow tubing made of glass fibers oriented in longitudinal and circumferential relationship, but without interweaving or interlacing of the fibers. Moreover, the method and apparatus is particularly adapted to provide a specific form of tubing especially useful in containing liquid under pressure for use in desalinization systems. The inner longitudinals on such tubing, as best seen in FIG. 15, are axially straight and have a limited area of contact with the forming member or mandrel to thereby facilitate relative movement or separation therebetween. The inner longitudinals are resin impregnated to anchor or adhere the innermost of the circumferential windings to thereby prevent snubbing and snarling thereof on pulling of the tubing off the mandrel. The outer layer of longitudinals is also resin impregnated, in this case to anchor the outermost layer of circumferentials. In addition to improving the longitudinal strength of the tubing, the outer longitudinals also afford a means by which tension forces may be applied to the tubing for moving the tubing axially relative to the mandrel.

The special tubing application is not to be construed as limiting, however, since it is apparent that all of the tubing fibers may be resin impregnated if desired, particularly in the case of commercial pipe and the like where cost and maximum structural properties are the important factors over and above any other considerations.

Various modifications and changes may be made with regard to the foregoing detailed description without departing from the spirit of the invention or the scope of the following claims.

I claim:

1. The method of continuously forming elongated articles comprising the steps of:
   orienting a plurality of first fibers about a longitudinal axis in parallel relationship to each other and to said axis;
   advancing said first fibers along said longitudinal axis;
   winding a plurality of second fibers about said axis and upon said first fibers;
   urging said first fibers about said axis in a direction opposite the direction of said winding and at a rate sufficient to compensate for the displacement of said first fibers due to said winding step to thereby maintain said first fibers in said relationship;
   and bonding certain of said fibers together in assembled relationship.

2. The method of continuously forming elongated articles comprising the steps of:
   orienting a plurality of first fibers about a longitudinal axis in parallel relationship to each other and to said axis;
   advancing said first fibers along said longitudinal axis;
   winding a plurality of second fibers about said axis and upon said first fibers;
   urging said first fibers about said axis in a direction opposite the direction of said winding and at a rate sufficient to compensate for the displacement of said first fibers due to said winding step to thereby maintain said first fibers in said relationship;
   orienting a plurality of third fibers about said longitudinal axis and upon said second fibers in parallel relationship to each other and to said axis;
   and bonding certain of said fibers together in assembled relationship.

3. The method of forming elongated hollow articles comprising the steps of:
   orienting a plurality of first fibers circumferentially about the circumference of a forming member in parallel relationship to each other and to the longitudinal axis of said mandrel;
   moving said fibers relative to said mandrel and along said longitudinal axis;
   winding a plurality of second fibers about said axis and upon said first fibers;
   relatively slowly rotating said mandrel and said first fibers thereon about said axis and in a direction opposite the direction of said winding to thereby maintain said first fibers in said relationship;
   and bonding certain of said fibers together in assembled relationship.

4. Apparatus for continuously forming elongated articles, said apparatus comprising:
   a frame;
   a mandrel rotatably mounted to said frame and oriented along a longitudinal axis;
   guiding means for a plurality of first fibers including a guide member mounted to said frame in coaxial relationship to said mandrel for positioning said first fibers about the periphery of said mandrel in parallel relationship to each other and to said axis;
   means for supplying a plurality of second strands and including a guide member rotatable about said longitudinal axis in a first direction for winding said second fibers upon said first fibers;
   means for rotating said mandrel about said longitudinal axis in a second direction opposite said first direction for maintaining said first fibers in said parallel relationship;
   guiding means for a plurality of third fibers including a guide member mounted to said frame in coaxial relationship to said mandrel for positioning said third fibers upon said second fibers in parallel relationship to each other and to said axis;
   and means for gripping said third fibers and advancing said third fibers along said longitudinal axis.

References Cited

UNITED STATES PATENTS

| | | | |
|---|---|---|---|
| 1,932,942 | 10/1933 | Thordarson | 156—432 X |
| 2,723,705 | 11/1955 | Collins. | |
| 2,760,549 | 8/1956 | Nash et al. | 156—188 X |
| 3,033,729 | 5/1962 | Shobert | 156—149 |
| 3,068,133 | 12/1962 | Cilker et al. | 156—171 |
| 3,216,876 | 11/1965 | Tyhurst | 156—173 |
| 3,235,429 | 2/1966 | Boggs | 156—441 X |
| 3,249,481 | 5/1966 | Boggs | 156—432 X |

EARL M. BERGERT, *Primary Examiner.*

J. P. MELOCHE, *Assistant Examiner.*